United States Patent
DeJong (10) Patent No.: US 7,653,268 B1
(45) Date of Patent: Jan. 26, 2010

(54) SUBSTRATE GUIDED RELAY WITH POLARIZATION ROTATING APPARATUS

(75) Inventor: Christian Dean DeJong, Sammamish, WA (US)

(73) Assignee: Microvision, Inc., Redmond, WA (US)

(*) Notice: Subject to any disclaimer, the term of this patent is extended or adjusted under 35 U.S.C. 154(b) by 0 days.

(21) Appl. No.: 12/167,923

(22) Filed: Jul. 3, 2008

(51) Int. Cl.
G02B 6/00 (2006.01)
G02B 6/26 (2006.01)
G02B 6/42 (2006.01)
G02B 5/30 (2006.01)

(52) U.S. Cl. .............. 385/11; 385/27; 385/31; 385/39; 359/485; 359/629; 359/636

(58) Field of Classification Search .......... 385/11, 385/27, 31, 33, 39; 359/483–502, 618, 629, 359/630, 633, 636, 850
See application file for complete search history.

(56) References Cited

U.S. PATENT DOCUMENTS

| | | | |
|---|---|---|---|
| 6,829,095 B2 | 12/2004 | Amitai | |
| 7,021,777 B2 | 4/2006 | Amitai | |
| 7,418,170 B2 | 8/2008 | Mukawa et al. | |
| 7,570,859 B1* | 8/2009 | DeJong | 385/133 |
| 7,613,373 B1* | 11/2009 | DeJong | 385/33 |
| 2003/0165017 A1* | 9/2003 | Amitai | 359/636 |
| 2005/0180687 A1 | 8/2005 | Amitai | |
| 2006/0228073 A1* | 10/2006 | Mukawa et al. | 385/31 |
| 2006/0274296 A1 | 12/2006 | Tolbert et al. | |
| 2007/0159673 A1 | 7/2007 | Freeman et al. | |
| 2007/0171328 A1* | 7/2007 | Freeman et al. | 349/65 |
| 2008/0025667 A1 | 1/2008 | Amitai | |

FOREIGN PATENT DOCUMENTS

| | | |
|---|---|---|
| WO | WO-2006/085308 | 8/2006 |
| WO | WO-2007/054928 | 5/2007 |
| WO | WO-2008/023367 | 2/2008 |

\* cited by examiner

*Primary Examiner*—Daniel Petkovsek
(74) *Attorney, Agent, or Firm*—Kevin D. Wills

(57) ABSTRACT

A substrate guided relay (600) includes an input coupler (601), an output coupler (603), and an optical substrate (602). Light is delivered from the input coupler (601) to the optical substrate (602), and then to the output coupler (603). Partially reflective coatings can be used at interfaces (606,607) between components. Partially reflective coatings or other devices (501) can be also used to create one or more copies of light. Light polarization alteration devices (661,662,663,664, 665) can be used within the substrate guided relay (600), alone or in combination, to tailor the polarization of light to the designer's needs. Such devices, such as half-wave plates, provide the designer with increased flexibility regarding the design and manufacture of the substrate guided relay (600).

17 Claims, 7 Drawing Sheets

SUBSTRATE GUIDED RELAY WITH POLARIZATION ROTATING APPARATUS

BACKGROUND

1. Technical Field

This invention relates generally to optical relay systems, and more particularly to a substrate guided relay that incorporates a polarization rotating apparatus, such as a half-wave plate, configured to transform light having substantially a first polarization to a second polarization within the substrate guided relay.

2. Background Art

Substrate guided relays are devices that transmit light rays from a source to a viewer. Generally speaking, substrate guided relays are optical transfer devices that include a substrate, which may manufactured from glass or fused silica, and which directs light from a relay input to a relay output. This light can be guided along its path by the optical transfer properties of the substrate. Additionally, the optical transfer properties of the substrate can work in tandem with reflective or diffractive devices coupled to the substrate. The surfaces of the substrate can also work to direct the light to its intended destination. In many applications, this end destination is a viewing region that is directed to a projection surface or a user's eye. One application of substrate guided relays is that of a near-to-eye display in which the viewing region projects directly into the pupil of a user.

Substrate guided relays generally include three basic components: an input that collects and receives light from a source, a substrate that transfers the light, and an output that delivers light away from the substrate. In many applications, it is advantageous to keep the various components of the substrate guided relay assembly small, as they are sometimes used as head mounted displays or other compact display systems. This desire to keep size to a minimum creates challenges, however, for the designer. In particular, when a source of light is small, the light often has a smaller spatial extent. It can therefore be challenging for a substrate guided relay designer to create a display having a pupil that is much larger than the extent of the source. Where small light sources are used, such as scanned beam light sources, it is often advantageous to "homogenize" the incoming light by making many copies of the light. By way of example, commonly assigned, co-pending U.S. patent application Ser. No. 12/167,892 entitled "Optical Substrate Guided Relay with Input Homogenizer" filed Jul. 3, 2008, and commonly assigned, co-pending U.S. patent application Ser. No. 12/167,882 entitled "Substrate Guided Relay with Homogenizing Input Relay," filed Jul. 3, 2008, each of which is incorporated herein by reference, teach methods and apparatuses for homogenizing light with substrate guided relays. While homogenization is a useful technique to improve output image quality, it sometimes requires the use of sophisticated optical coatings. It is sometimes challenging to manufacture well-behaved coatings integrated with substrate guided relays in a cost effective manner. Additionally, some coatings are easier to manufacture than are others.

There is thus a need for an improved substrate guided relay for use in light homogenization applications.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention include an optical relay system employing a light source and a substrate guided relay. In one embodiment, a suitable light source is a scanned light source, such as a Microelectromechanical System (MEMS) light source. Note that while a MEMS source will be used herein as an exemplary embodiment, it will be clear to those of ordinary skill in the art having the benefit of this disclosure that embodiments of the invention are not so limited. Other light sources—in addition to MEMS sources—can also be used, including liquid crystal display light sources, liquid crystal on silicon light sources, digital light processing light sources, organic light emitting diode light sources, and so forth, with the homogenizing devices described herein to expand the exit pupil of the overall system.

As the output of such a source is generally small, many embodiments of the present invention employ light homogenization techniques to create one or more copies of the light.

The one or more copies can be made within the substrate guided relay, between the substrate guided relay and the light source, or both. In some embodiments, copies of the light are made in two directions within the substrate guided relay.

In some embodiments where copies of the incoming light are made within the substrate, partially reflecting coatings are used. To simplify the overall design of the coatings that are integrated with the substrate guided relay, embodiments of the present invention include a light polarization alteration device, one example of which is a half-wave plate. In one embodiment, the half-wave plate is embedded into the structure of the substrate guided relay to modify the predominant polarization of light within certain regions of the substrate guided relay.

By way of example, one embodiment of the present invention permits a half-wave plate to be integrated with the substrate guided relay such that all or most of the internal partially reflective coatings to be s-polarized coatings—which are often simpler to manufacture than are p-polarized coatings. Further, even where most of the partially reflective coatings are s-polarization partially reflective coatings, the substrate guided relay can still be kept in a single plane. The polarization alteration devices of the present invention can help to simplify fabrication and to give the designer greater flexibility in creating the overall geometry of the substrate guided relay.

Other embodiments of the present invention employ a light polarization alteration device integrated within the substrate guided relay at other locations, such that p-polarization partially reflective coatings can be used. For instance, in some applications, the coating between the optical substrate and the output coupler benefits from p-polarization partially reflective coatings, as these coatings can work to balance the brightness of the output image from bottom to top or from left to right. Where such behavior is desired, the light polarization alteration devices of the present invention can be used to permit the use of p-polarization partially reflective coatings in selected regions of the substrate guided relay.

As an aside concerning the partially reflective coatings described herein, in substrate guided relay systems, light interactions with partially reflective coatings often happen at or near Brewster's angle. In Brewster's angle interactions, the p-polarization component reflection is often zero for common layered reflective materials. (This angle can occur in roughly a thirty to fifty degree range.) When making partially reflective coatings, it is common practice to select at least two materials and layer them together: a high refractive index material and a low refractive index material placed in layers upon a substrate guided relay surface to obtain the desired reflectance. Multiple layers can be used, but materials having a large difference in refractive index generally require fewer layers to achieve a given reflectance.

At Brewster's angle, the reflectance for a material pair is essentially zero. At near Brewster's angles, the reflectance is generally low. However, the reflectance changes rapidly with angle and wavelength. As a result, normally effective coating material pairs can become poor choices for a partially reflective coating. When the angles of interest (in the design of the substrate guided relay) for high/low index pairs cover Brewster's angle, manufacturing material pairs having significant reflectance (>20%) for p-polarized light over a range of angles and wavelengths is difficult. Further, creating p-polarization partially reflective coatings that are non-absorbing and have flat wavelength responses is also difficult. Generally speaking a large number of reflective material layers are required.

Figure 1:
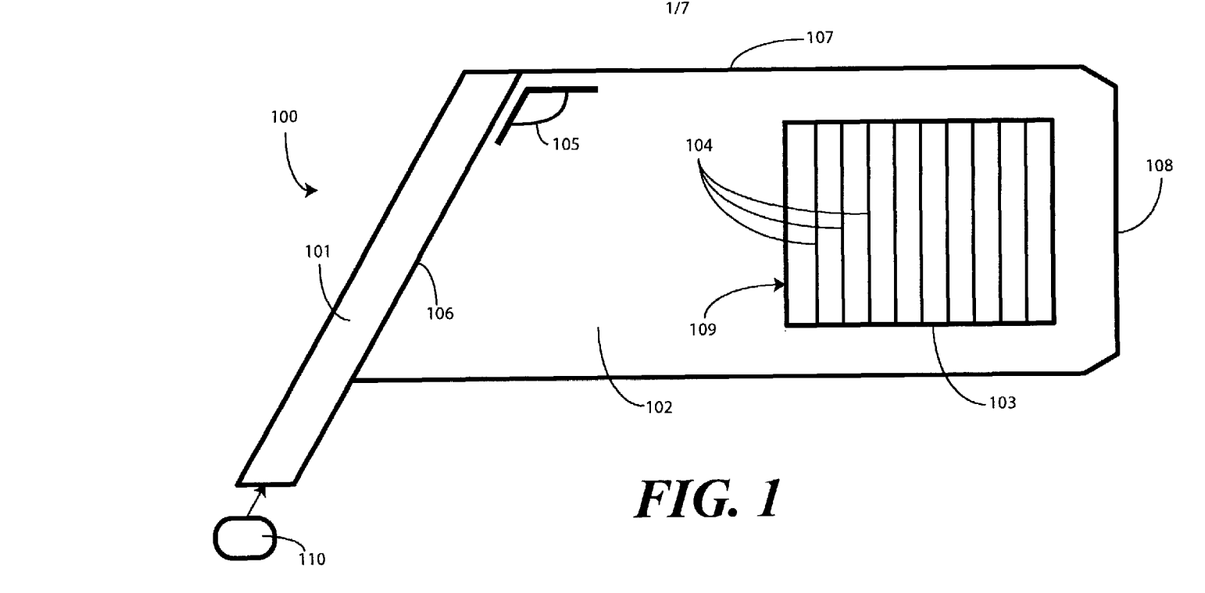
FIG. 1 illustrates a top, plan view of a substrate guided relay in accordance with embodiments of the invention.
Figure 2:
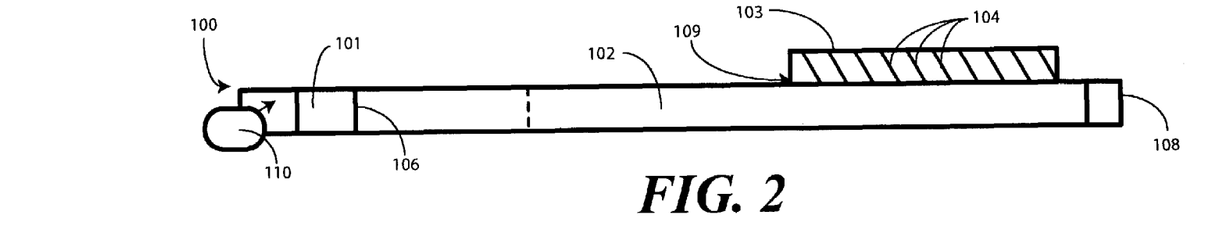
FIG. 2 illustrates a side, elevation view of a substrate guided relay in accordance with embodiments of the invention.

Turning now to FIGS. 1 and 2, illustrated therein is one embodiment of a substrate guided relay 100 having an input coupler 101, an optical substrate 102, and an output coupler 103. FIG. 1 is a top, plan view of the substrate guided relay 100, while FIG. 2 is a side elevation view of the substrate guided relay 100. Embodiments and operating characteristics of such substrate guided relays are described in commonly assigned, copending U.S. patent application Ser. No. 11/775,511, filed Jul. 10, 2007, entitled "Substrate-Guided Relays for Use with Scanned Beam Light Sources," which is incorporated herein by reference.

In the embodiment of FIG. 1, the input coupler 101 is coupled to the optical substrate at an angle 105. This angle affects how light leaves the input coupler 101 and enters the optical substrate 102. While this angle 105 can be orthogonal, and while any of a variety of angles can work for angle 105, in one embodiment angle 105 is between 30 and 60 degrees. Experimental testing has shown that an angle of 45 degrees is effective for many applications.

The input coupler 101 collects and receives light. This light can be collected from a light source 110. Alternatively, the light can be collected from a light homogenizing device. Where light is delivered from a light source 110, one suitable light source is a MEMS scanned light source. Where light is delivered from a light homogenizing device, a MEMS source can be used to deliver the light to the light homogenizing device. Examples of MEMS scanning light sources, such as those suitable for use with embodiments of the present invention, are set forth in US Pub. Pat. Appln. No. 2007/0159673, entitled, "Substrate-guided Display with Improved Image Quality," which is incorporated by reference herein.

MEMS light sources work well with embodiments of the present invention due to their generally small and compact size. Further, MEMS light sources have other beneficial features, including the fact that all three colors are scanned at the same time, thereby reducing blur occurring due to source movement in some applications, such as where the source is not fixed relative to the viewer. While MEMS sources work effectively with embodiments of the present invention, as noted above it will be clear to one of ordinary skill in the art having the benefit of this disclosure, that embodiments of the present invention are not so limited. Other light sources can also be used, including liquid crystal display sources, light emitting diode sources, and so forth.

Light is delivered from the input coupler 101 to the optical substrate 102 through a first interface 106. The input coupler 101 can be coupled to the optical substrate 102 along the first interface 106 in a variety of ways, including adhesives, glues, and epoxies. In one exemplary embodiment, the input coupler 101 is coupled to the optical substrate 102 through optical contacting. Where an optical contacting process is used, this bond can be enhanced by chemically treating the surfaces prior to contacting.

In one embodiment, the first interface 106 includes a partially reflective coating. While various applications and desired performance attributes will work to determine what kind of partially reflective coating is used, in one embodiment the first interface 106 includes a metallic coating, such as silver, that is configured to work as a p-polarization partially reflective coating. Such a coating can be used to vary reflectance along this first interface 130. For instance, such a coating can have a high reflectance near the input, and a lower reflectance further from the input. This varied reflectance effect can be achieved with a variable thickness coating that includes a metal layer Note that where a light polarization alteration device is used, as will be described in FIGS. 6 and 7, the light polarization alteration device can be used to permit coatings other than p-polarization partially reflective coatings to be used. For instance, in some embodiments, s-polarization partially reflective coatings can be used at the first interface 106.

The partially reflective coatings descried herein, including the partially reflective coating used at the first interface 106, are generally known to those of ordinary skill in the art. Such coatings can be used to reflect some components of incident light and transmit others. Further, such coatings can be used transmit or reflect certain levels of light depending upon polarization. These coatings can be metallic layers—such as thin layers of silver. Alternatively, they may be multi-layer structures deposited by a vapor deposition process or other suitable manufacturing process. Additional details about the construction of suitable partially reflective coatings may be found in application Ser. No. 11/603,964, entitled "Substrate-Guided Display with Improved Image Quality," filed Nov. 21, 2006 and incorporated by this reference in its entirety.

Some coatings can be configured to preferentially reflect incident rays across a particular range of angles. For example, several monolithic layers of partially reflecting material can be configured to exhibit a polarization preference, and angle preference, or a combination thereof. Alternatively, separate angle preferential and polarization preferential partial reflective layers may be used, with each layer contributing a portion of the reflected energy.

As used herein, an s-polarization partially reflective coating includes coatings that have an s-polarization reflectance within a thirty to seventy percent range (some occurring near fifty percent), and a lower (generally less than ten percent or so) reflectance p-polarization reflectance for angles and wavelengths of interest. A p-polarization partially reflective coating includes coatings that reflect both p-polarized light and s-polarized light, and exhibit reflectance of p-polarized light at a wavelength and angle of interest greater than 20% operating in the vicinity of Brewster's angle (for a low index material with an index ~1.5 and a high index material with refractive index of 1.7-2.1, the angle is ~50 degrees when going from high index to low index, and 30 degrees when going from low index to high index). A partially reflective coating used for applications well away from Brewster's angle would generally be an s-polarization partially reflective coating as no special design considerations are made to obtain a significant (>20%) p-polarization reflectance.

S-polarization partially reflective coatings are often easier to manufacture than p-polarization partially reflective coatings, as they can be made from multiple layer reflective components that are vapor deposited on surfaces or slices of the substrate guided relay 100. Further, s-polarization partially reflective coatings can be used to effectively create copies of the incoming light within the substrate guided relay 100 by transmitting some light and reflecting other light. Additionally, s-polarization partially reflective coatings generally are not affected by Brewster's angle because the reflection of an s-polarization partially reflective coating naturally increases as the angle of incidence increases. P-polarization partially reflective coatings, despite tending to be thicker, more complicated, and sometimes less durable, are useful in substrate guided relays as well. One reason this is true because they have a natural decrease in reflectance as the angle of incidence increases below Brewster's angle. This "inflection" in the reflectance allows for the possibility of naturally allowing reflectance to decrease as angle in incidence increases. As such, p-polarization partially reflective coatings can be used to make output images appear more uniform when used in conjunction with the output coupler.

Once light is delivered from the input coupler 101 to the optical substrate 102 through the first interface 106, the light passes along the optical substrate 102 to the output coupler 103. Embodiments of the optical substrate 102 can vary in thickness. Some embodiments described herein range from two to five millimeters in thickness. Some are single layer optical substrates, while others are multilayer optical substrates. The length of the overall optical substrate 102 can vary as well. Embodiments of the present invention generally employ substrates of between thirty and one hundred millimeters for applications such as eyewear with integrated optical displays. The distal end 108 of the optical substrate 102 can be squared, semi-hexagonal, rounded, or may take other shapes. Additionally, the top and bottom edges of the optical substrate 102 can take on a variety of shapes or geometrical configurations. For instance, the portion of the optical substrate 102 used to transmit the image can be a trapezoid in cross section that encloses the contact points between the input coupler 101 and the optical substrate 102, and the most distal corners of the input coupler 101.

In some embodiments, light passing along the optical substrate 102 is confined within the optical substrate 102 by the principles of total internal inflection. When the light reflects off an edge of the optical substrate 102, e.g., edge 107, it is generally reflected at an equal and opposite angle to the angle of incidence and continues propagating along the optical substrate 102. Partially reflective coatings, including s-polarization partially reflective coatings, can be used along the sides of the optical substrate to assist with total internal reflection transfer.

Once light as passed sufficiently along the optical substrate 102, distally from the input coupler 101, the light reaches the output coupler 103. The output coupler 103 is configured to receive light from the optical substrate 102 and to enable a viewer (not shown) to see a displayed image, whether it be projected on a projection surface or directly into the viewer's eye. (Note that where a projection surface is used for displaying the image, the projection surface would not be placed at the exit pupil. A lens may be placed at the exit pupil to focus light upon a projection surface placed beyond the lens.) In one embodiment, the output coupler 103 directs light to the viewer through a plurality of partially reflective layers 104. Note that the output coupler 103 may be disposed either on top of, or beneath, the optical substrate 102.

As with the input coupler 101, the output coupler 103 can be coupled to the optical substrate 102 in a variety of ways, including adhesives, glues, or via optical contacting. Light enters the output coupler 103 through the second interface 109. In one embodiment, a second interface 109, which occurs between the optical substrate 102 and the output coupler 103, includes a partially reflective coating. In one embodiment, this partially reflective coating comprises a multi-layer coating, which reflects a significant portion of s-polarized light while transmitting most of the p-polarized light. In another embodiment, this partially reflective coating layer comprises a p-polarization partially reflective coating due to its natural decrease in reflectance as angles increase below the Brewster's angle.

In one embodiment, the output coupler 103 comprises a series of partially reflective layers 104 that are configured to receive light from the optical substrate 102 and to direct the light away from the substrate guided relay 100. In so doing, the series of partially reflective layers 104 direct light toward a viewing region, which can either be a projection surface or, in some embodiments, a user's pupil. Where the viewing region is that of the user's pupil, the luminous flux from the output coupler 103 containing light from all portions of the image can be characterized by an exit pupil. Where the exit pupil is sufficiently large as to cover the user's pupil, the user will be able to view images presented by the substrate guided relay 100 without vignetting. To observe an entire image at once, the exit pupil generally must be large enough to fill the user's pupil over the range of pupil positions required by a particular application.

The array of partially reflective layers 104 helps both to direct light away from the substrate guided relay 100 and to expand the exit pupil of the overall device. Note that while partially reflective coatings are used as the partially reflective layers 104 in one embodiment, it will be clear to those of ordinary skill in the art having the benefit of this disclosure that the invention is not so limited. Other devices, including diffractive elements, holograms or lenses, may also be used in conjunction with the output coupler 103.

Also as noted above, when the source delivering light to the substrate guided relay 100 is sufficiently large, an ample amount of light can be delivered to the optical input source 110 such that an image is delivered to a viewer with sufficient brightness and uniformity. However, when a substrate guided relay is used with a compact light source, such as a scanned beam source that is desirable for near-to-eye optics due to its compact size and lightweight construction, brightness and uniformity can suffer due to the small diameter of input light. In accordance with embodiments of the present invention, to produce output images of sufficient uniformity and brightness, homogenization of the light is used to make many copies of the input beam of light. This homogenization can be done in a variety of ways.

Figure 3:
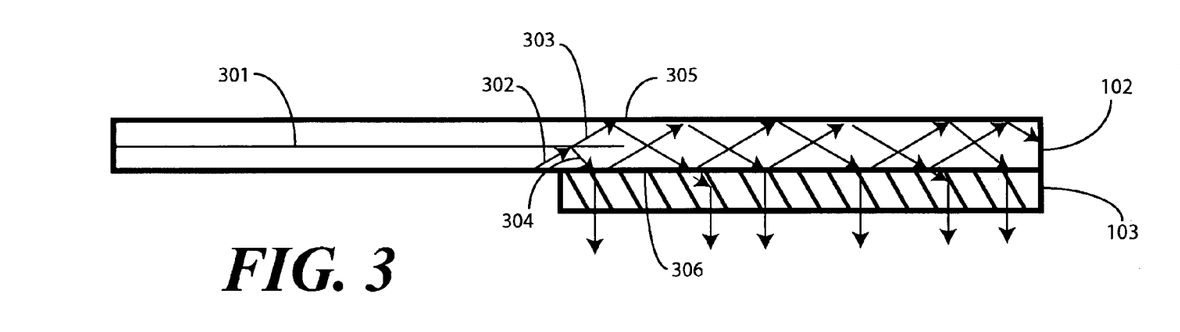
FIGS. 3-5 illustrate various means of homogenizing light in accordance with embodiments of the invention.

Turning now to FIG. 3, illustrated therein is one exemplary homogenization device as set forth in the '511 application cited above. In this figure, homogenization is accomplished via an internal layer of partially reflective material within the substrate guided relay itself.

In FIG. 3, the optical substrate 102 includes an internal homogenization layer 301. The internal homogenization layer 301 is integral with the optical substrate 102, and can be formed as an interface between substrate layers of differing indices of refraction. Alternatively, the internal homogenization layer 301 can be a beam splitting type interface, or may be a partially reflective layer that reflects some light and transmits other light.

The internal homogenization layer 301 causes a single impinging beam of light 302 to form multiple beams of light 303, 304. Light beam 303 passes through internal homogenization layer 301 unaffected and reflects off the inner surface 305 of the optical substrate 102. Light beam 304 reflects off layer 306 and creates a second light beam having a different path through the optical substrate 102. Thus, the internal homogenization layer 301 enables the system to duplicate or multiply a single light beam into multiple light beams. The multiple light beams may then exit the substrate guided relay through the output coupler 103 at different locations, providing a homogenized exit pupil and field of view to a user.

Figure 4:
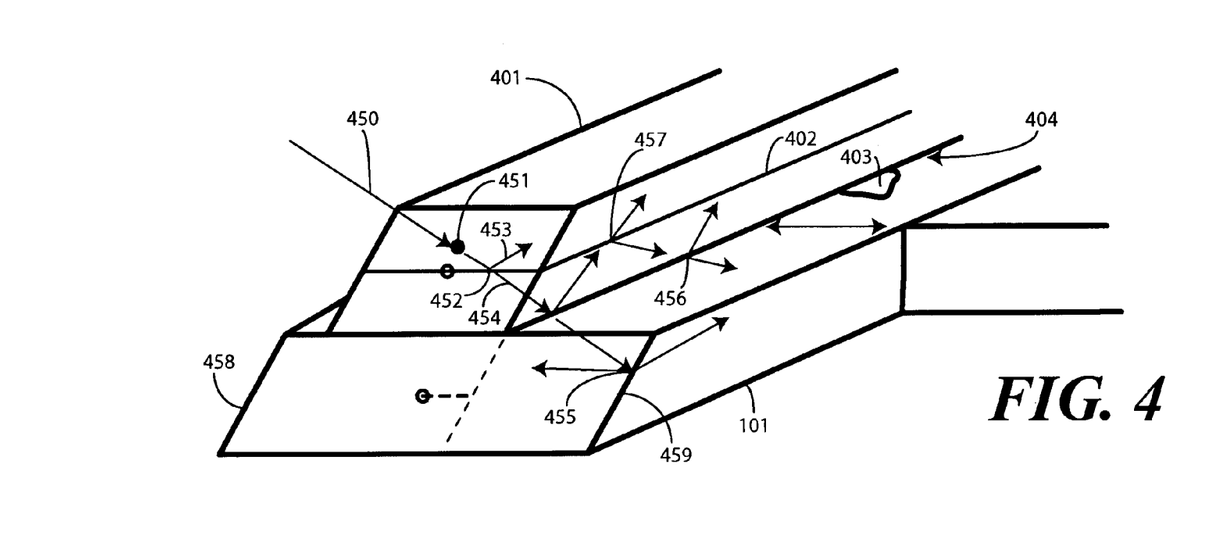

Turning now to FIG. 4, and as described in the '511 application cited above, additional homogenization can be provided by a light homogenizing layer 401 coupled to the input coupler 101 in an offset location relative to the input coupler 101. The light homogenizing layer 401, in one embodiment, uses partially reflective layers both within the light homogenizing layer 401 and between the light homogenizing layer 401 and the input coupler 101 to homogenize incoming light 450 prior to delivering that light to the input coupler 101.

In FIG. 4, the partially reflective layers 402,403 can be seen. The light homogenizing layer 401 is disposed atop the input coupler 101 in an off-set orientation. While the light homogenizing layer 401 is off-set relative to the input coupler 101, the placement of the light homogenizing layer 401 can vary across its interface with the top of the input coupler 101. In one embodiment, where the cross sectional width of the light homogenizing layer 401 is less than the cross sectional width of the input coupler 101, their respective edges can be aligned. In another embodiment, these edges are offset by a predetermined amount. In another embodiment, the opposite edges are aligned. In effect, the light homogenizing layer 401 can be placed anywhere along the interface between it and the input coupler 101 so long as a portion of each device's cross sectional widths overlap.

Regardless of placement, in one embodiment the lengthwise axis of the light homogenizing layer 401 is parallel with the length-wise axis of the input coupler 101. For many applications, such a configuration will provide adequate coupling of light from the light homogenizing layer 401 to the input coupler 101. It will be clear to those of ordinary skill in the art having the benefit of this disclosure that the invention is not so limited, however. Where other geometric configurations of light homogenizing devices and optical input devices are employed, other axes configurations may be used.

In one embodiment, the cross sectional size of the light homogenizing layer 401 is smaller than that of the input coupler 101. For instance, in such an embodiment the cross sectional width of the light homogenizing layer 401 is shorter than the cross sectional width of the input coupler 101. In another embodiment, the cross sectional area of the light homogenizing layer 401 is less than that of the input coupler 101.

While a smaller light homogenizing layer 401 is illustrated, it will be clear to those of ordinary skill in the art having the benefit of this disclosure that the invention is not so limited. For example, in an alternate embodiment, the cross sectional size of the light homogenizing layer 401 may be larger than that of the input coupler 101. In yet another embodiment, the light homogenizing layer 401 and the input coupler 101 can be similar in size and stair-stepped to produce to offsets (one on each side) that are different in size.

Partially reflective layer 402 is disposed within the light homogenizing layer 401, while partially reflective layer 403 is disposed along the interface 404 between the light homogenizing layer 401 and the input coupler 101.

When incoming light 450 enters the light homogenizing layer 401, such as at point 451, the incoming light 450 intersects partially reflective layer 402 at point 452. A portion 453 of the incoming light 450 is reflected, while a portion 454 of the incoming light 450 passes through partially reflective layer 402. Thus, a copy of the incoming light 450 is made. Another copy is made when the portion 454 of light intersects partially reflective coating layer 403 at point 455. Another copy is made at point 456, another at point 457, and so forth.

As shown, when light encounters partially reflective layer 403, some of the light enters the input coupler 101. When this light encounters either side edge 458,459 of the input coupler 101, it mimics the path that it had in the light homogenizing layer 401 due to the offset orientation. Thus, the light travels in two dimensions, spiraling down the length of the input coupler 101. This two-dimensional, spiraling motion of the light in conjunction with the offset works to create a high degree of homogenization. At the same time, the partially reflective layers 402,403 can be placed in parallel planes, thereby simplifying manufacture and reducing cost.

Figure 5:
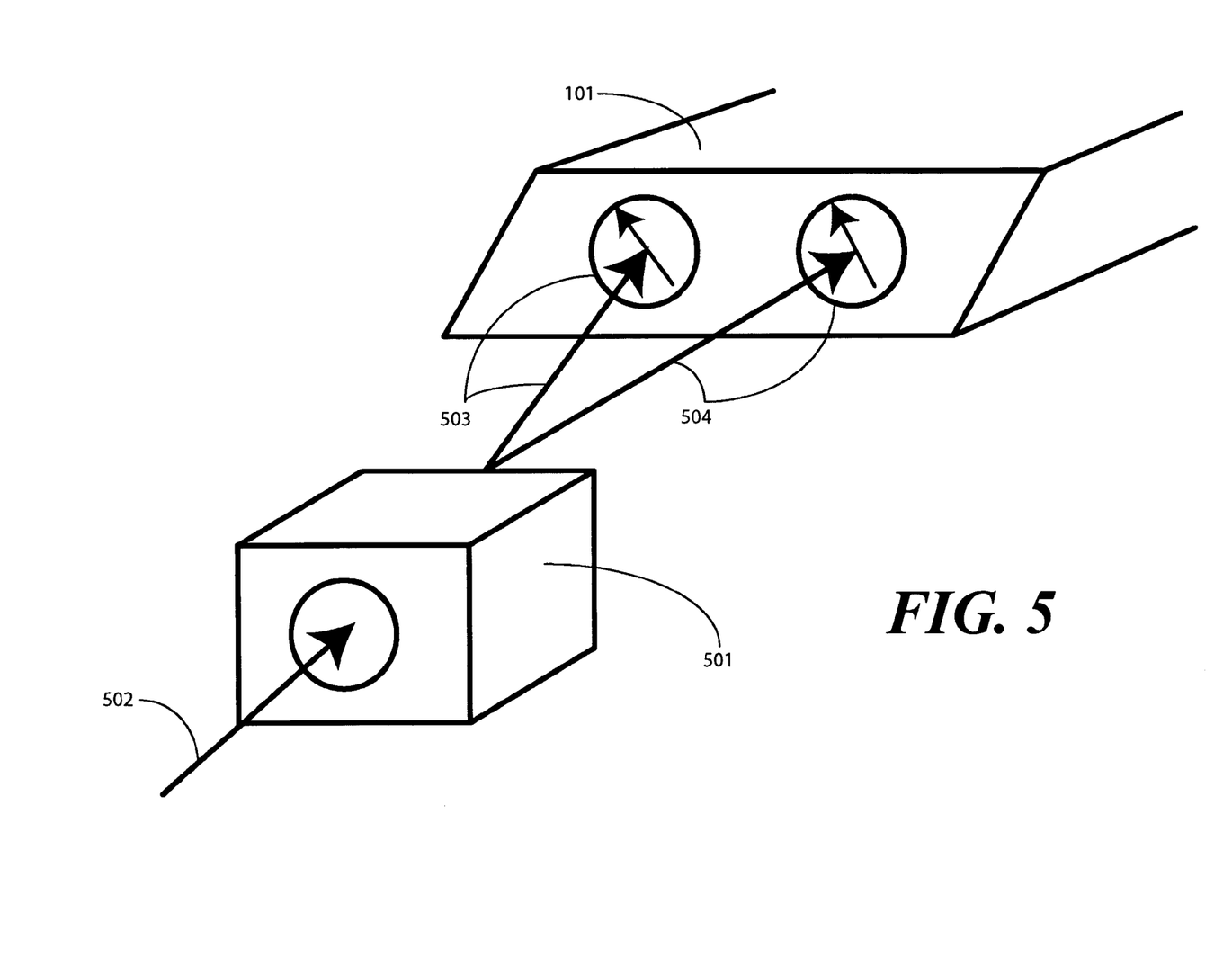

Turning now to FIG. 5, and as described in the '511 application cited above, additional homogenization can be provided by a light homogenizing relay device 501 disposed between the source and the substrate guided relay. This light homogenizing relay device 501 can create one or more copies of the incoming light for delivery to the input coupler 101. Alternatively, the light homogenizing relay device 501 can be used to deliver multiple copies of incoming light to a light homogenizing layer (401), such as that shown in FIG. 4.

Where the light homogenizing relay device 501 is used, incoming light 502 first interacts with the light homogenizing relay device 501. The light homogenizing relay device 501 then creates one or more copies of the light for delivery to the input coupler 101. As shown in FIG. 5, two copies 503,504 of the incoming light 502 are delivered to the input coupler 101. One advantage of the light homogenizing relay device 501 is that it makes copies of the incoming light 502 while retaining the angular spread of that beam.

The light homogenizing relay device 501 can take many forms, as there are many physical devices and configurations of light homogenizing relay devices that can achieve the task of replicating an incoming light 502 while retaining the angular spread of that beam. These devices include pupil expanders, multi-lens arrays, partially reflective plates, birefringent crystals, optical elements having two or more partially reflective layers disposed therein, prisms, diffractive elements, and combinations thereof.

Where homogenization is employed, its function is to make many copies of the image content in at least one direction. As shown in the illustrative embodiments of FIGS. 3 and 4, often partially reflective layers or coatings are used to enhance homogenization. Generally speaking, from a coating design point, it is convenient to design the coatings for a single polarization (either S or P) due to the steep angle of the light interfacing with the surfaces of the substrate guided relay. The use of single-polarization coatings can permit a greater level of control over the reflectance across wavelengths and angles of incidence.

For effective homogenization to be properly accomplished in two directions, light-surface interactions in perpendicular polarizations are required. As noted above, it is sometimes difficult to manufacture well-behaved p-polarization partially reflective coatings at near total internal reflection angles. P-polarization partially reflective coatings near Brewster's angle tend to be either thick or fragile, or they contain a metal layer that has absorption losses.

Further, it can be difficult to create sufficient homogenization with partially reflective coatings disposed in two dimensions. This is true due to the differing polarization response of light interacting with multi-dimensional coating layers. For instance, one polarization, such as p-type polarization that occurs in the plane of incidence to a medium change, tends to pass through many partially reflective coatings due to the Brewster's angle effect. It can be very difficult to get even a small amount of p-polarized light to reflect from a non-metalized coating, even when many layers are used. Further compounding the problem, p-polarized partially reflective coatings tend to exhibit wide variations in reflectance as a function of wavelength and angle of incidence. For this reason, many p-polarizing partially reflective coatings do not homogenize light with sufficient effectiveness as to be used in near-to-eye substrate guided relay applications with scanned or other beam sources. Metal partially reflective coatings can be used to produce sufficiently good quality p-polarization coatings with desirable reflectance properties. However each time the light encounters these coatings a fraction (typically ten percent or more) of the light is absorbed. These losses can be acceptable if light does not encounter the surface a large number of times and/or if there are few of these types of coatings in a particular system. However, for homogenization of a small input source to obtain a large pupil, multiple p-polarization reflective surfaces are typically required. Further, light generally encounters each surface many times, thereby reducing the optical efficiency of the system.

Light that is s-polarized is generally easier to homogenize with partially reflective coatings. S-polarized light can be reflected with a partially reflective coating deposited along an interface having only a few layers. Further, s-polarizing partially reflective coatings are often less expensive than are the p-polarizing counterparts. Further, s-polarizing partially reflective coatings generally provide better performance across wavelength and angle than do p-polarizing partially reflective coatings. Note that coatings, in general, whether s-polarizing or p-polarizing, will reflect some component of the s-polarized light and some component of the p-polarized light and transmit some of each component as well.

In accordance with embodiments of the invention, a light polarization alteration device, such as a half-wave plate can be embedded within the substrate guided relay to tune the polarization of light passing through the substrate guided relay in accordance with the designer's needs. The use of the light polarization alteration device permits all or most of the coating interactions to be of one type, such as the s-polarization partially reflective coating that is easier to manufacture and control.

On the other hand, p-polarization partially reflective coatings can be used to create uniform output images as well. For example, the designer wishing to take advantage of the natural decrease in reflectance associated with p-polarization partially reflective coatings can use the light polarization alteration devices of the present invention to configure light incident upon the output coupler to be suitable for interaction with p-polarization partially reflective coatings.

Figure 6:
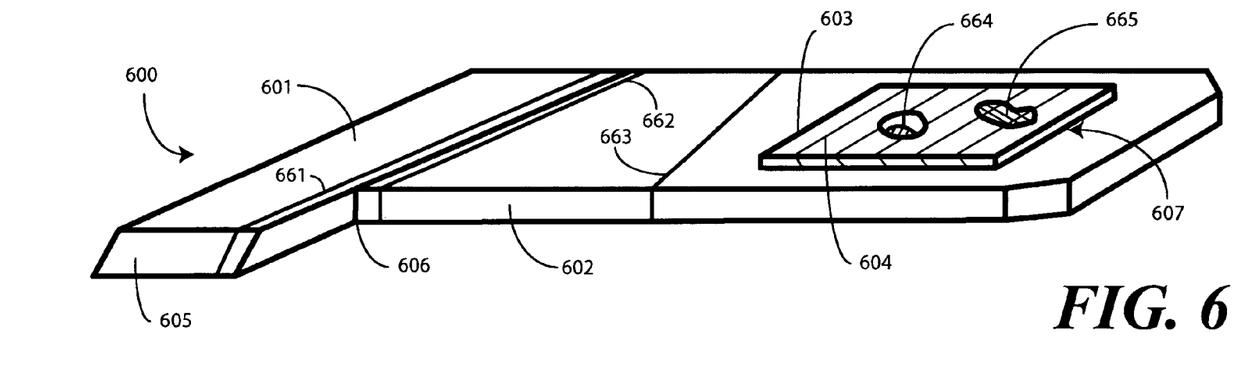
FIG. 6 illustrates a perspective view of a substrate guided relay having a light polarization alteration device in accordance with embodiments of the invention.
Figure 7:
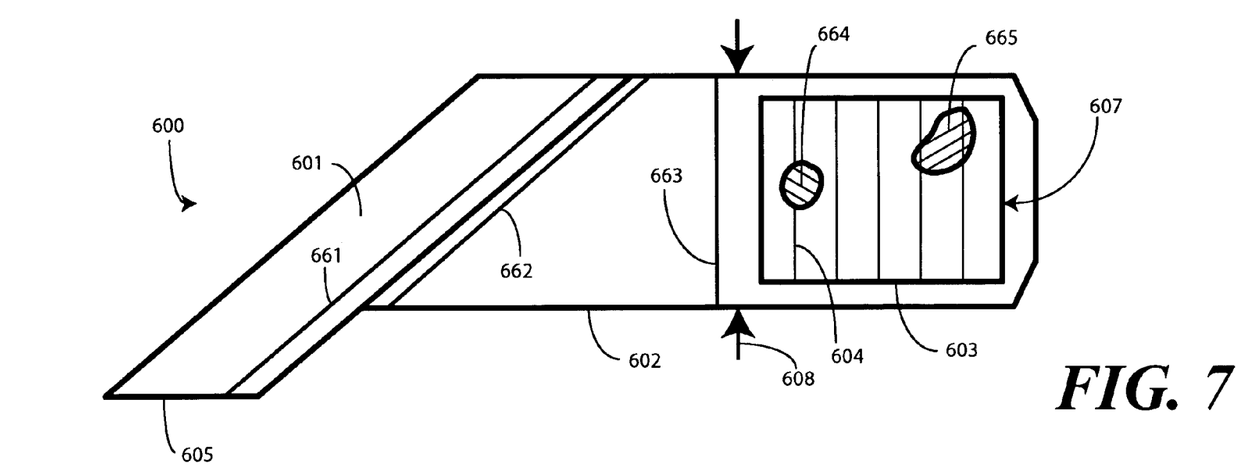
FIG. 7 illustrates a top, plan view of a substrate guided relay having a light polarization alteration device in accordance with embodiments of the invention.

Turning now to FIGS. 6-7, illustrated therein are a perspective view and a top plan view, respectively, of embodiments of substrate guided relays 600 employing light polarization alteration devices 661,662,663,664,665 in accordance with the invention. Note that FIGS. 6-7 illustrate multiple embodiments, as five light polarization alteration devices 661,662, 663,664,665 are shown in various locations throughout the substrate guided relay 600. In some applications, one light polarization alteration device will be used. In other applications, multiple light polarization alteration devices will be used. FIGS. 6-7 are intended to illustrate various exemplary locations for light polarization alteration devices in accordance with the invention, and are not intended to illustrate only a single embodiment employing all five light polarization alteration devices 661,662,663,664,665. In the discussion that follows, each light polarization alteration device 661,662,663,664,664 will be discussed individually, as if only one is being used. It will be obvious to one of ordinary skill in the art having the benefit of this disclosure, however, that combinations of light polarization alteration devices 661, 662,663,664,665 can also be used.

The substrate guided relay 600 includes an input coupler 601 configured to receive light from a source, an optical substrate 602, and an output coupler 603. The input coupler 601 has an input 605 for receiving light from a source. The optical substrate 602 is coupled to the input coupler 601 and is configured to receive light from the input coupler 601.

The optical substrate 602 transfers the light across the optical substrate to the output coupler 603. The output coupler 603 is coupled to the optical substrate 602 distally from the input coupler 601 at a second interface 607, and upon receiving light from the optical substrate 602, delivers the light away from the substrate guided relay 600. The output coupler 603 can use one or more partially reflective layers 604 to deliver the light away from the substrate guided relay 600.

In one embodiment, a light polarization alteration device is integrated with the substrate guided relay 600 to tailor the polarization of light passing through the substrate guided relay 600 in accordance with their needs. For example, in one embodiment a light polarization alteration device 661 is integrated within the input coupler 601 and is disposed between the input 605 and the first interface 606 (i.e., the interface between the input coupler 601 and the optical substrate 602). This location constitutes one exemplary location for the light polarization alteration device 661. Where the light polarization alteration device 661 is disposed in this location, the partially reflective coating used at the first interface 606 will generally be a p-polarization partially reflective coating to take advantage of the decrease in reflectance a p-polarization layer will exhibit as light passes from the input coupler 601 to the optical substrate 602.

In another embodiment, the light polarization alteration device 662 is integrated with the optical substrate 602 and is located between the first interface 606 and the second interface 607. In this exemplary configuration, the light polarization alteration device 662 is substantially parallel with the first interface 606. In most applications, the light polarization devices would be disposed at an interface between components. The polarization of the interacting with a partially reflective coating depends upon which side the partially reflective coating is disposed. For instance, when using light polarization alteration device 661, light encounters the light polarization alteration device 661 first, and then encounters a partially reflective coating. When light polarization alteration device 662 is used, light encounters a partially reflective coating first and then encounters the light polarization alteration device 662.

Where the light polarization alteration device 662 is disposed in such a location, s-polarization partially reflective coatings can be used at the first interface 606, thereby taking advantage of the fact that these coatings are easier to manufacture. Further, by being able to use s-polarization partially reflective coatings at the first interface 606, the use of p-polarization partially reflective coatings in a particular substrate guided relay design can be reduced or eliminated, thereby simplifying the fabrication process. Further, as total internal reflection interactions with the surfaces of the input coupler 601 tend to be s-polarized, the use of an s-polarization partially reflective coating at the first interface 606 helps to confine light that may be otherwise lost.

In another embodiment, the light polarization alteration device 663 is again integrated with the optical substrate 602 and is located between the first interface 606 and the second interface 607. However, contrary to the location of light polarization alteration device 662, in this embodiment the light polarization alteration device 663 is disposed substantially parallel with a width-wise cross section 608 of the optical substrate 602. As with the use of light polarization alteration device 662, when light polarization alteration device 663 is used, s-polarization partially reflective coatings can be used at the first interface 606.

In another embodiment, the light polarization alteration device 664 is disposed between the optical substrate 602 and the output coupler 603. In this configuration, the light polarization alteration device 664 can be integrated into the optical substrate 602, integrated into the output coupler 603, or can be coupled therebetween. Note that where the light polarization alteration device 664 is integrated within the optical substrate 602, the light polarization alteration device 664 is technically prior to the second interface 607, but is still considered to be "between" the optical substrate 602 and the output coupler 603.

Where the light polarization alteration device 664 is disposed between the optical substrate 602 and the output coupler 603, the partially reflective coating used at the second interface can be a p-polarization partially reflective coating. This can be desirable for balancing the brightness in output image from left to right or top to bottom.

In another embodiment, the light polarization alteration device 665 can be disposed atop the output coupler 603. In this configuration, the partially reflective coating at the second interface 607 can be an s-polarization partially reflective coating.

It is now clear that by using multiple light polarization alteration devices, the use of a particular coating—be it an s-polarization partially reflective coating or a p-polarization partially reflective coating—can be reduced or eliminated in the design. For instance, if both light polarization alteration device 661 and 662 are used, p-polarization partially reflective coatings can be eliminated. Another example is where light polarization alteration devices 661 and 664 are used, with light polarization alteration device 664 located on the top of the optical substrate 602 with an s-polarizing partially reflective coating disposed atop the light polarization alteration device 664. If light interacts with the top and bottom of the input coupler 601 as p-polarized interactions, this configuration with one of light polarization alteration devices 662,663, or 664 would additionally eliminate p-polarization partially reflective coatings from being required.

One type of light polarization alteration device suitable for use in embodiments of the invention is the half-wave plate. While a half-wave plate is one suitable choice for the light polarization alteration device, it will be clear to those of ordinary skill in the art having the benefit of this disclosure that the invention is not so limited. Other wave plates, including a quarter-wave plate or a three-quarter wave plate may also be used. Generally, the light polarization alteration device can be any type of phase retarding device.

Figure 8:
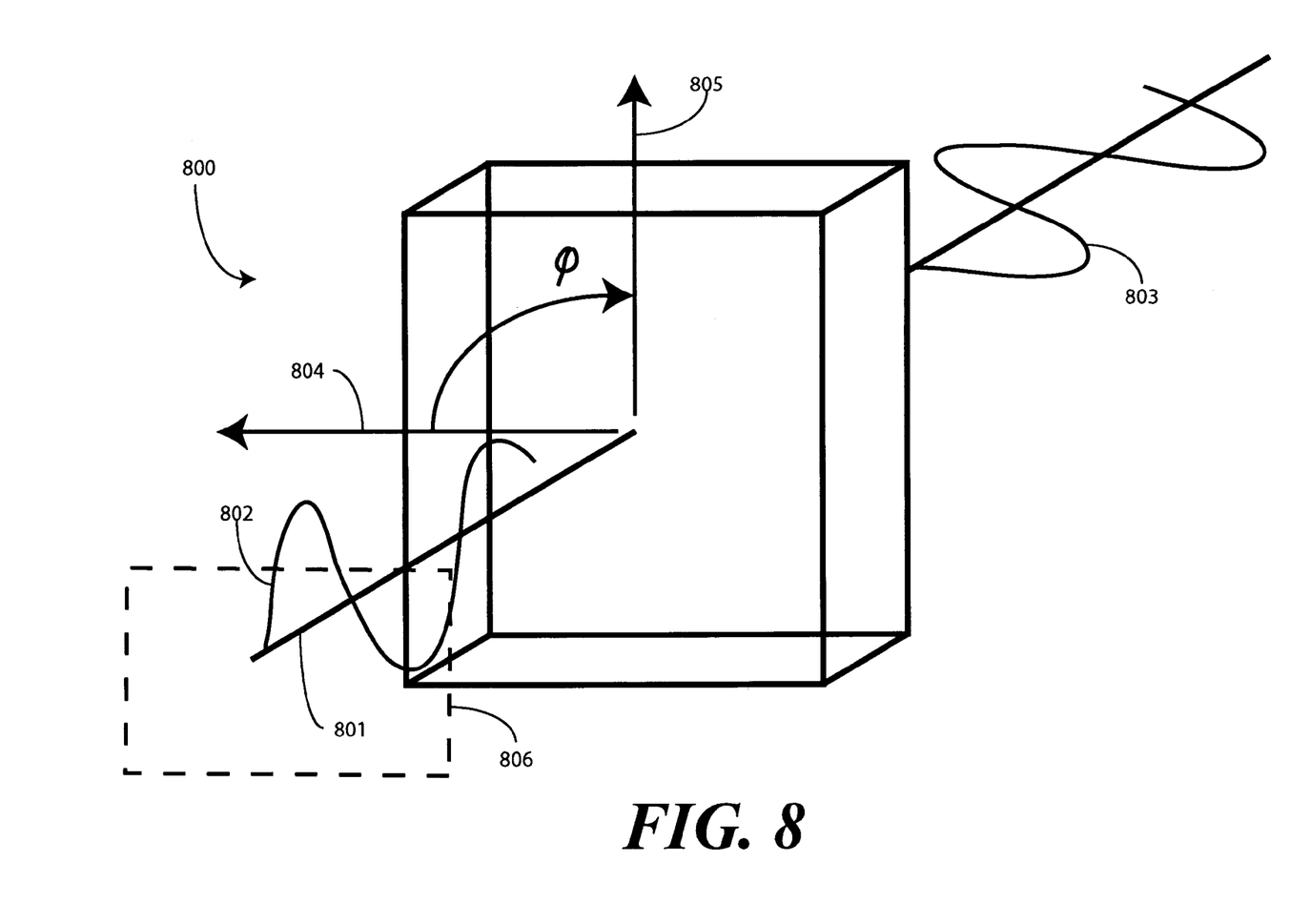
FIG. 8 illustrates a half-wave plate suitable for use with substrate guided relays in accordance with embodiments of the invention.

Turning now to FIG. 8, illustrated therein is one embodiment of a half-wave plate 800. A half-wave plate 800 is an optical device that changes a predominant mode of polarization of light 801 as that light 801 passes through the plate. Half-wave plates are capable of rotating the polarization of light by 90 degrees. S-polarization and p-polarization are defined in terms of the orientation of the field with a surface in a particular geometry. A half-wave plate can change light 802 that would have an s-polarized interaction with a surface 806 into light 803 that will have a p-polarized interaction with that same surface 806. One example of a half-wave plate is a birefringent crystal of a particular thickness. Such a crystal is cut so that light waves parallel to one axis 804 move faster through the half-wave plate than do those parallel to another axis 805. As such, the phase changes and, in one particular geometry, s-polarized light 802 becomes p-polarized light. In other geometries, p-polarized light becomes s-polarized light.

Birefringent crystals are one example of a crystalline half-wave plate. Other types of half-wave plates are also available, including polymer half-wave plates. Either crystalline half-wave plates or polymer half-wave plates can be used with embodiments of the invention. The choice will depend upon performance, location, and fabrication processes.

In most substrate guided relays, the manufactured items having precise tolerances are generally in the same plate. As such, a half-wave plate can be incorporated into components of the substrate guided relay, such as the input coupler or the optical substrate by using a slicing and polishing operation.

Figure 9:
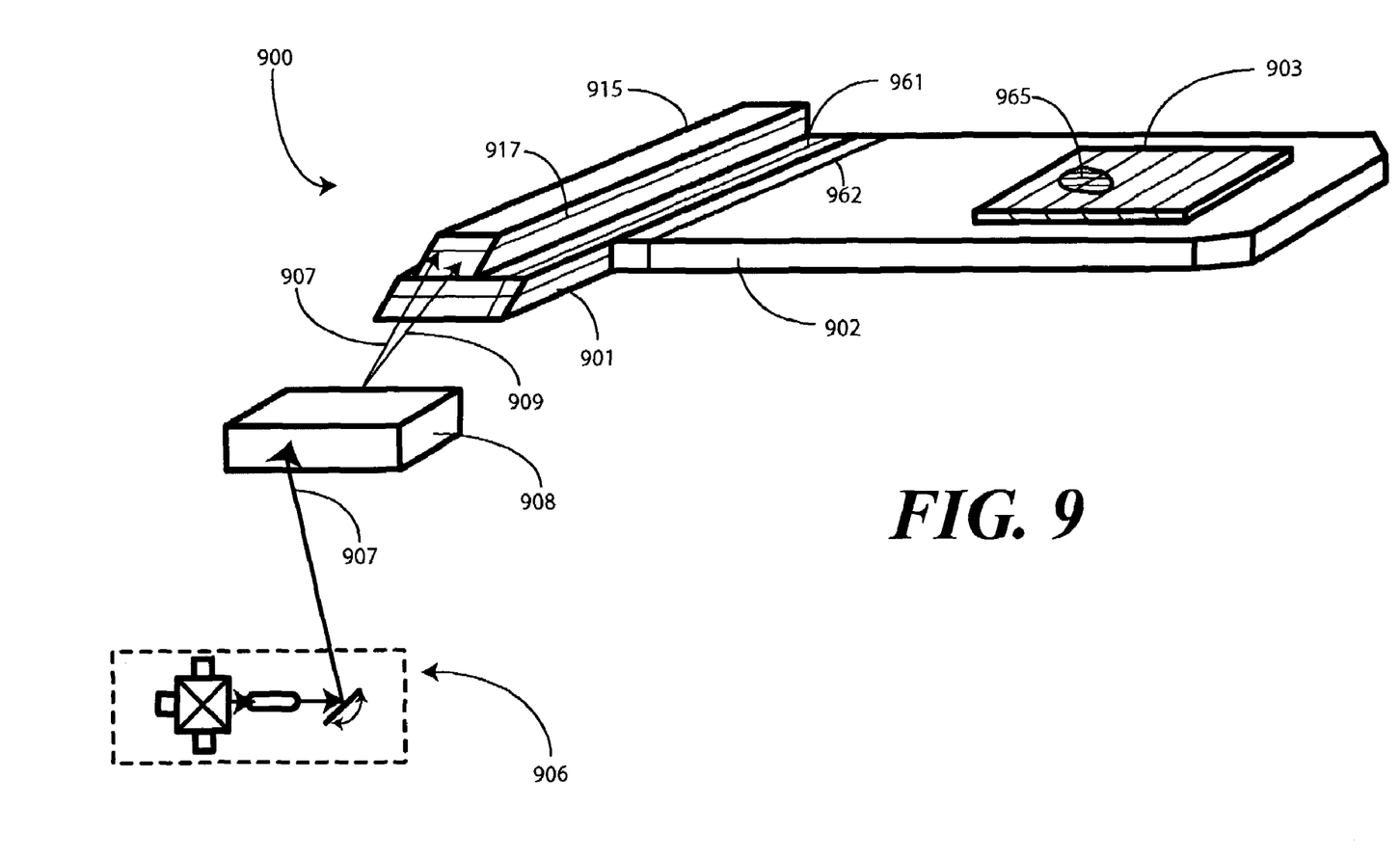
FIG. 9 illustrates one example of a light transmission system in accordance with embodiments of the invention.

Turning now to FIG. 9, illustrated therein is an embodiment combining the light polarization alteration devices and light homogenization devices in a single substrate guided relay 900. Note that this is just one exemplary combination, as many are available from the various embodiments described herein.

In FIG. 9, the substrate guided relay 900 includes four components: an input coupler 901, an optical substrate 902, an output coupler 903, and a light homogenizing layer 915. The light homogenizing layer 915 is coupled to the input coupler 901 in an offset location. Two light polarization alteration devices are used—in one embodiment, half-wave plate 962 and half-wave plate 965 are used. Alternatively, in another embodiment, half-wave plates 961 and 962 can be used. The use of these two half-wave plates 961,962 permit the design of a substrate guided relay 900 having no p-polarization partially reflective coatings.

In one embodiment, the light homogenizing layer 915 includes at least one partially reflective coating layer 917 disposed therein. The partially reflective coating layer 917 is configured to make at least one copy of the received light 907,909, and to deliver the light and the at least one copy to the input coupler 901. The light then gets delivered to the optical substrate 902.

In one embodiment, the input coupler 901 comprises a multi-layer input coupler. The multi-layer input coupler includes one or more partially reflective layers therein that are configured to make at least one copy of light passing through the input coupler 901. In another embodiment, a single layer input coupler 901 is used with a partially reflective layer disposed between the input coupler 901 and light homogenization layer 915.

In one embodiment, an optional light homogenizing relay device 908 is included. The light homogenizing relay device 908 is disposed between a source 906 of light and the substrate guided relay 900. The light homogenizing relay device 908 receives light 907 from the source 906 and makes at least one copy of the light 907 outside the input coupler 901. Two or more light beams 907,909 are then delivered to the light homogenization layer 915 (or to the input coupler 901 where no light homogenization layer 915 is employed).

One advantage of the illustrative embodiment of FIG. 9 is the fact that expensive p-polarization partially reflective coatings can be reduced or eliminated from the design. Not only does the use of the half-wave plates 961,962 eliminate the need for p-polarization partially reflective coatings at the interface between the input coupler 901 and the optical substrate 902 and the interface between the optical substrate 902 and the output coupler 903, but since the light homogenizing layer 915 is offset from the input coupler 901, p-polarized copies are made when the light intersects the edges of the input coupler 901. As such, one need only use s-polarization partially reflective coatings as the partially reflective coating layers to obtain additional homogenization.

Embodiments of the present invention offer a thin, compact form factor that may be incorporated into lightweight devices such as eyeglasses, helmet shields, or other display devices. Such display devices may be transparent or non-transparent. Other devices, such as mobile communication devices may also employ the relays.

Figure 10:
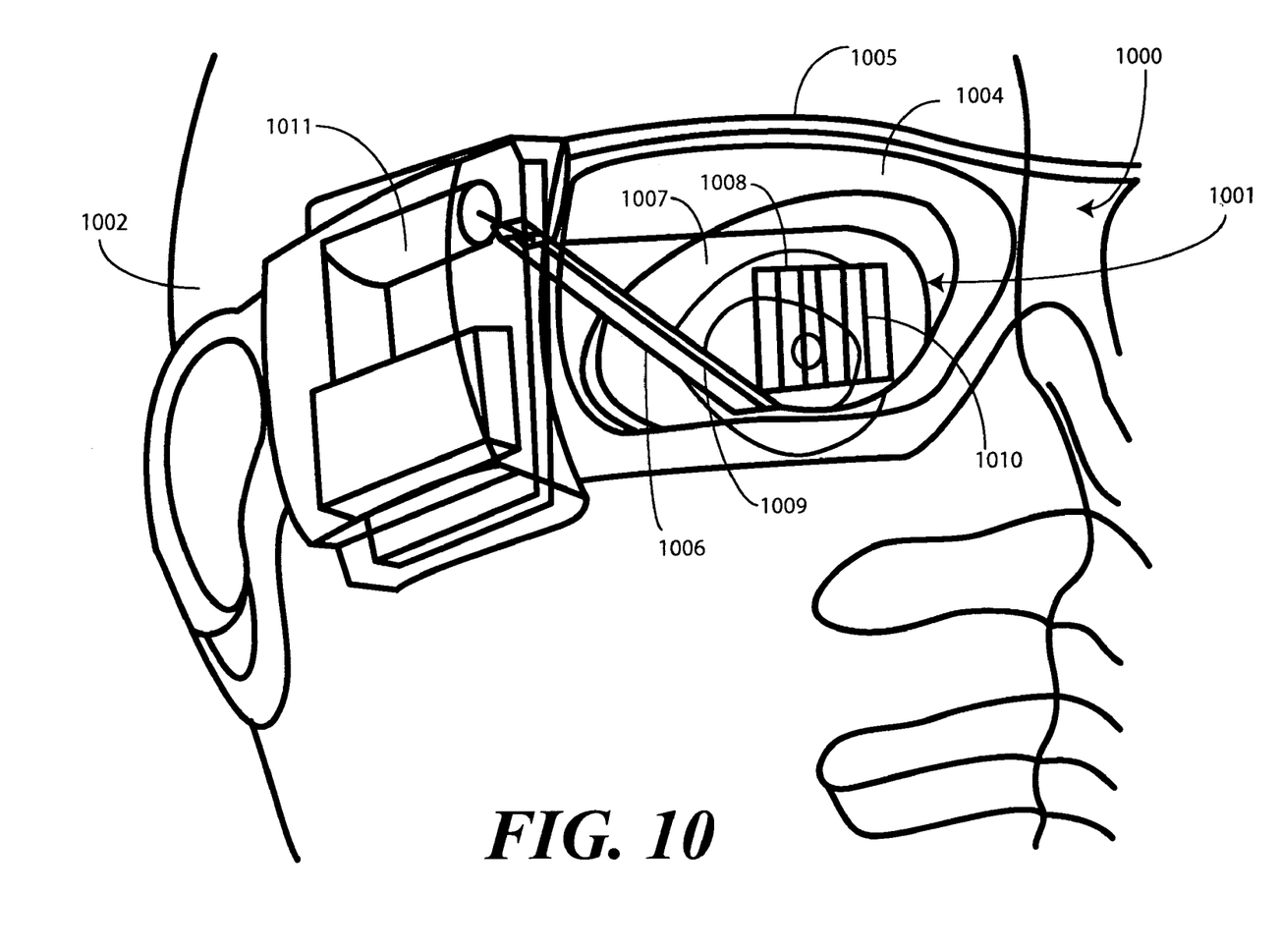
FIG. 10 illustrates eyewear that includes one substrate guided relay in accordance with embodiments of the invention.

Turning now to FIG. 10, illustrated therein is one embodiment of an eyewear device 1000 using a substrate guided relay 1001 in accordance with embodiments of the invention. The eyewear device 1000 is configured to present visible images to the wearer 1002 by projecting those images into the wearer's eye. The eyewear device 1000 includes lens assemblies 1004 that are coupled to a frame 1005. In one embodiment, at least one of the lens assemblies 1004 has integrated therewith a substrate guided relay 1001 configured in accordance with embodiments of the invention.

The substrate guided relay 1001 includes an input coupler 1006, an optical substrate 1007, and an output coupler 1008. A half-wave plate 1009 is integrated with the substrate guided relay 1001 and is configured to convert a first polarization of light to a second polarization of light within the substrate guided relay 1001. In the exemplary embodiment of FIG. 10, the half-wave plate 1009 is integrated within the input coupler 1006. An optional light homogenizing device can be coupled to or before the input coupler 1006.

The output coupler 1008 is coupled to a major face of the optical substrate 1007. The output coupler 1008 delivers the light and its copies to the user's pupil with the assistance of one or more partially reflective surfaces 1010.

In one embodiment, the eyewear device 1000 (as well as the substrate guided relay 1001) is configured such that the wearer can see images beyond the lens assemblies 1004 while the image-producing source 1011 is active. In one embodiment, the image-producing source 1011 comprises a MEMS scanned laser source. Such sources are small and lightweight, and are thus easily integrated into the frame 1005 of the eyewear device 1000.

To help prevent or eliminate dark regions or gaps that may occur when the output of the scanned light source is smaller than a light receiving surface of the input coupler 1006, an optional light homogenizing relay device (not shown) can be disposed between the scanned light source 1011 and the substrate guided relay 1001. The light homogenizing relay device makes at least one copy of the light beam projected by the scanned light source 1011, and delivers both the light beam and the copy or copies to the substrate guided relay 1001.

The light homogenizing relay device can take many forms. For example, in one embodiment, the light homogenizing relay device comprises a pupil expander, such as a multi-lens array. In another embodiment, the light homogenizing relay device comprises flat, partially reflective plates. In another embodiment, the light homogenizing relay device comprises birefringent crystals. In yet another embodiment, the light homogenizing relay device comprises prisms. In another embodiment, the light homogenizing relay device comprises diffractive elements. Each of these may be used separately or in combination.

While in some embodiments only one copy of the light beam is made, in other embodiments more than one copy of the light beam projected by the scanned light source 1011 can be made. For instance, in one embodiment a replicating prism can be used as the light homogenizing relay device. Such a replicating prism can create between two and five copies of the incoming beam.

Additionally, the copies of the light beam projected by the light source can be delivered to the substrate guided relay 1001 in a variety of ways. For instance, in one embodiment the copies are delivered on-axis with the original light beam such that the copies are substantially parallel with the original light beam. In another embodiment, the light homogenizing relay device can be positioned so as to slightly bias the light beam and the copies to compliment the optical properties of the substrate guided relay 1011. By way of example, the light homogenizing relay device may be positioned such that the light beam and copies are biased somewhere between plus or minus 20 degrees from the initial path.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An optical substrate guided relay, comprising:
   an input coupler configured to receive light from a source;
   an optical substrate coupled to the input coupler and configured to receive the light from the input coupler and transmit the light across the optical substrate; and
   an output coupler coupled to the optical substrate, configured to receive the light from the optical substrate and deliver the light away from the optical substrate guided relay with one or more partially reflective layers;
   a light homogenizing layer coupled to the input coupler in an offset configuration, wherein the light homogenizing layer is configured to make at least one copy of the light and to deliver the light and the at least one copy of the light to the optical substrate; and
   a light polarization alteration device, integral with the optical substrate guided relay, configured to convert a first polarization light to a second polarization light, wherein the light polarization alteration device is disposed between the light homogenizing layer and the input coupler.

2. The optical substrate guided relay of claim 1, wherein the light polarization alteration device comprises a phase retarding device.

3. The optical substrate guided relay of claim 2, wherein the phase retarding device is disposed between the optical substrate and the output coupler.

4. The optical substrate guided relay of claim 2, wherein the phase retarding device is disposed atop the output coupler.

5. The optical substrate guided relay of claim 4, the light polarization alteration device comprises one of a half-wave plate, a quarter-wave plate, or a three-quarter wave plate.

6. The optical substrate guided relay of claim 2, wherein the phase retarding device comprises a polymer wave plate.

7. The optical substrate guided relay of claim 6, wherein the light polarization alteration device is disposed substantially parallel with the first interface.

8. The optical substrate guided relay of claim 6, wherein the light polarization alteration device is disposed substantially parallel with a width-wise cross section of the optical substrate.

9. The optical substrate guided relay of claim 2, wherein the phase retarding device comprises a crystalline wave plate.

10. The optical substrate guided relay of claim 1, wherein the input coupler comprises an input for receiving the light from the source, further wherein the input coupler and the optical substrate are coupled together at a first interface, wherein the light polarization alteration device is integral with the input coupler and disposed between the input and the first interface.

11. The optical substrate guided relay of claim 1, wherein the input coupler and the optical substrate are coupled together at a first interface, further wherein the output coupler is coupled to the optical substrate distally from the input coupler at a second interface.

12. The optical substrate guided relay of claim 1, wherein the first polarization light comprises one of s-polarized light or p-polarized light.

13. The optical substrate guided relay of claim 12, wherein the second polarization light comprises another of s-polarized light or p-polarized light.

14. The optical substrate guided relay of claim 1, wherein the input coupler comprises a multi-layer input coupler configured to homogenize the light by creating at least one copy of the light.

15. The optical substrate guided relay of claim 1, wherein the input coupler and the optical substrate are coupled together such that an input coupler major axis and an optical substrate major axis are between 30 and 60 degrees.

16. An optical substrate guided relay system, comprising:
    a scanned light source;
    an input coupler configured to receive light from the scanned light source;
    an optical substrate coupled to the input coupler and configured to receive the light from the input coupler and transmit the light across the optical substrate; and
    an output coupler coupled to the optical substrate, configured to receive the light from the optical substrate and deliver the light away from the optical substrate guided relay system;
    a light homogenizing layer coupled to the input coupler in an offset configuration, wherein the light homogenizing layer is configured to make at least one copy of the light and to deliver the light and the at least one copy of the light to the optical substrate; and
    a light polarization alteration device, integral with the optical substrate guided relay system, configured to convert a first polarization light to a second polarization light, wherein the light polarization alteration device is disposed between the light homogenizing layer and the input coupler.

17. An eyewear device having lens assemblies coupled to a frame and being capable of presenting visible images to a wearer, the eyewear device comprising:
    an image-producing source integrated with the frame; and
    a substrate guided relay integrated with at least one of the lens assemblies;
    wherein the substrate guided relay comprises:
        an input coupler configured to receive light from the image-producing source;
        an optical substrate coupled to the input coupler and configured to receive the light from the input coupler and transmit the light across the optical substrate;
        an output coupler coupled to the optical substrate, configured to receive the light from the optical substrate and deliver the light away from the substrate guided relay;
        a light homogenizing layer coupled to the input coupler in an offset configuration, wherein the light homogenizing layer is configured to make at least one copy of the light and to deliver the light and the at least one copy of the light to the optical substrate; and
        a light polarization alteration device, integral with the optical substrate guided relay, configured to convert a first polarization light to a second polarization light, wherein the light polarization alteration device is disposed between the light homogenizing layer and the input coupler.

* * * * *

UNITED STATES PATENT AND TRADEMARK OFFICE
CERTIFICATE OF CORRECTION

| | | |
|---|---|---|
| PATENT NO. | : 7,653,268 B1 | Page 1 of 1 |
| APPLICATION NO. | : 12/167923 | |
| DATED | : January 26, 2010 | |
| INVENTOR(S) | : Christian Dean DeJong | |

It is certified that error appears in the above-identified patent and that said Letters Patent is hereby corrected as shown below:

In the Specification:

Column 1:

Add the following Government Rights Statement after the title and before the Background Section:

STATEMENT REGARDING FEDERALLY SPONSORED RESEARCH OR DEVELOPMENT

This invention was made with government support under Contract Number FA8650-06-C-6724 awarded by the U.S. Air Force. The government has certain rights in the invention.

Signed and Sealed this
First Day of October, 2013

Teresa Stanek Rea
*Deputy Director of the United States Patent and Trademark Office*